United States Patent [19]

Wagner, III et al.

[11] 4,288,342

[45] Sep. 8, 1981

[54] INORGANIC WATER-SOFTENING BEAD

[75] Inventors: Joseph E. Wagner, III, Newark, Del.; Lloyd E. Williams, Bel Air, Md.

[73] Assignee: J. M. Huber Corporation, Locust, N.J.

[21] Appl. No.: 50,938

[22] Filed: Jun. 21, 1979

Related U.S. Application Data

[63] Continuation-in-part of Ser. No. 883,006, Mar. 3, 1978, abandoned.

[51] Int. Cl.$^3$ .......................... C02F 1/42; C11D 3/12; C11D 7/20; C11D 11/02
[52] U.S. Cl. ................................. 252/140; 252/89.1; 252/135; 252/174.14; 252/174.25; 252/179
[58] Field of Search ........... 252/131, 135, 140, 174.25, 252/179, 174.14, 89.1

[56] References Cited

U.S. PATENT DOCUMENTS

| | | | |
|---|---|---|---|
| 3,932,316 | 1/1976 | Sagel | 252/532 |
| 3,985,669 | 10/1976 | Krummel | 252/116 |
| 4,000,094 | 12/1976 | Fleming | 252/557 |
| 4,019,999 | 4/1977 | Ohren | 252/140 |
| 4,041,135 | 8/1977 | Williams | 423/329 |
| 4,071,377 | 1/1978 | Schwuger | 134/29 |
| 4,096,081 | 6/1978 | Phenicie | 252/89 |

FOREIGN PATENT DOCUMENTS

| | | | |
|---|---|---|---|
| 857881 | 12/1977 | Belgium | 252/89 |
| 2543976 | 4/1976 | Fed. Rep. of Germany | 252/140 |
| 2736903 | 2/1978 | Fed. Rep. of Germany | 252/89 |

*Primary Examiner*—Dennis L. Albrecht
*Attorney, Agent, or Firm*—Ernest A. Schaal; Harold H. Flanders

[57] ABSTRACT

An inorganic water-softening bead is disclosed having a density of from 36 to 46 lbs/cu ft consisting of at least 66% of sodium alumino silicate on an anhydrous basis; from 1 to 20% of sodium silicate; from 1 to 20% of a solubilizing agent, such as sodium sulfate; and the remainder being water. The sodium alumino silicate has a silica to aluminum oxide ratio of between 2:1 and 4:1 and a sodium oxide to aluminum oxide ratio of between 0.8:1 and 1:1. The sodium silicate has a silica to sodium oxide ratio of between 1:1 and 3.3:1.

8 Claims, No Drawings

INORGANIC WATER-SOFTENING BEAD

CROSS REFERENCE TO RELATED APPLICATIONS

This application is a continuation-in-part of copending U.S. Application Ser. No. 883,006 filed Mar. 3, 1978, now abandoned.

BACKGROUND OF THE INVENTION

1. Field of the Invention

In general, the present invention relates to water softeners and more especially to sodium alumino silicate water softeners.

2. Description of Prior Art

The detersive effect of even the best surfactants in detergents is severely decreased by the presence of calcium ions. Hard water has very little soil removing power. Therefore, it has been established that good cleaning of cottons by the usual organic surfactants including soap, can only be achieved if the calcium and magnesium ions of the system have been reduced to an insignificant level. To do this, various water softeners have been added to the detergents to sequester the calcium and magnesium ions. Examples of such water softeners have been phosphates and carbonates.

Phosphates and carbonates are good water softeners but, for ecological reasons, they have become undesirable additives in a detergent. Therefore, sodium alumino silicate has been recently used as a water softener. A sodium alumino silicate is added to a slurry of the detergent, which is then spray dried into bead form.

Some manufacturers do not use spray drying operations in forming the detergent. These manufacturers obtain a particular particle size and a particular density by blending, so that there will be no fractionation by later handling. This process works well with phosphates, but it does not work well with sodium alumino silicates. The problem has existed of how to get the sodium alumino silicate into the detergent so it will not separate upon handling for those who do not use the spray drying process.

PRIOR ART

None of the prior art addresses the problem of how to get a sodium alumino silicate into the detergent so it will not separate upon handling for those who do not use the spray drying process of forming the detergent bead.

U.S. Pat. No. 3,985,669 shows a composition comprising a water-insoluble aluminosilicate ion exchange material, an organic surface-active agent, a minor amount of an alkali metal oxide silicate solid and sodium sulfate. Unlike the present invention, this patent teaches admixing the aluminosilicate directly into the detergent compound.

U.S. Pat. No. 4,000,094 shows a composition containing a water-insoluble aluminosilicate, an organic detergent, process aids, and sodium sulfate. The processing aids are a mixture of a sodium carbonate and a water-soluble salt of an organic compound having from 1 to 6 carbon atoms. This patent teaches adding the aluminosilicate directly into the detergent compound using a spray drying process.

U.S. Pat. No. 4,019,999 shows a composition containing an alkali metal silicate, an aluminosilicate, an alkali metal or orthophosphate or pyrophosphate and sodium sulfate. This patent teaches adding the aluminosilicate directly into the detergent compound.

U.S. Pat. No. 4,071,377 shows a composition containing from 10% to 60% by weight alkali metal silicates; 10 to 65% by weight aluminosilicates on an anhydrous basis; and 0 to 40% by weight of other common constituents of mechanical dishwasher cleaning compositions. This patent teaches adding the aluminosilicate directly into the detergent compound.

SUMMARY OF THE INVENTION

Accordingly, it is an object of this invention to provide a new and highly effective water softener which overcomes the problem not addressed by the prior art as described above.

Another object of this invention is to provide a sodium alumino silicate water softener which can be dry blended with other ingredients in a dry detergent formulation so that it will not segregate upon further handling.

Other objects and a fuller understanding of the invention may be had by referring to the following description and claims.

The present invention overcomes the deficiencies of the prior art and achieves its objectives by forming an inorganic water-softening bead comprising at least 66% by weight sodium alumino silicate on an anhydrous basis; from 1 to 20% by weight of a binding agent; from 1 to 20% by weight of a solubilizing agent; and the remainder being water or residual moisture. These water-softening beads have a density between 36 and 46 lbs/cu ft, preferably 40 to 42 lbs/cu ft. The sodium alumino silicate may be either amorphous or crystalline. The silica to aluminum oxide ratio of the sodium alumino silicate is between 2:1 and 4:1; and the sodium oxide to aluminum oxide ratio is between 0.8:1 and 1.2:1. The binding agent is a sodium silicate having a silica to sodium oxide ratio of between 1:1 and 3.3:1, preferably about 2.5:1. The sodium silicate can be used in either the solid or liquid form. Suitable solubilizing agents include soluble phosphates, carbonates, bicarbonates, tetraborates and sodium sulfate, preferably sodium sulfate. The above ingredients are mixed together in a slurry which is then dried, preferably with nozzle atomization in a spray dryer at inlet temperatures below 540° C.

DESCRIPTION OF THE PREFERRED EMBODIMENTS

In its broadest aspect, the present invention is based on the discovery that an inorganic water-softening bead having a density of between 36 and 46 lbs/cu ft can be produced containing at least 66% by weight of sodium alumino silicate on an anhydrous basis; from 1 to 20% by weight of a binding agent; from 1 to 20% by weight of a solubilizing agent and the remainder being water or residual moisture. This material can be made by mixing together the above ingredients in a slurry and then drying them preferably with nozzle atomization in a spray dryer at inlet temperatures below 540° C.

The water-softening beads of the present invention have a density between 36 and 46 lbs/cu ft, preferably 40 to 42 lbs/cu ft. The desired density is based on the density of the detergent formulation in which the water-softening bead will be used. If the density of the water-softening bead does not match that of the detergent, the resulting blend will separate.

The sodium alumino silicate may be either crystalline or amorphous, having a silica to aluminum oxide ratio of between 2:1 and 4:1 and a sodium oxide to aluminum oxide ratio of between 0.8:1 and 1.2:1. Preferably, the sodium alumino silicate has a silica to aluminum oxide ratio between 2:1 and 3:1. An example of such a product is the product produced by the method of U.S. Pat. No. 4,041,135 which is herein incorporated by reference. Other sodium alumino silicates that will work are Zeolite X produced by the method of U.S. Pat. No. 2,882,244 and BLAZER sodium alumino silicate, a product sold under the BLAZER trademark of the J. M. Huber Corporation, which is produced by the method of U.S. patent application No. 621,314. Both U.S. Pat. No. 2,882,244 and U.S. patent application No. 621,314 are herein incorporated by reference. The silica to aluminum oxide ratio between 2:1 and 3:1 is preferred because the higher the silica to aluminum oxide ratio the less ion exchange capacity the sodium alumino silicate material has in the solution. Also it is desirable to have as high a sodium alumino silicate level as possible, to increase the ion exchange capacity of the bead.

Sodium silicate is used as the binding agent, with the silica to sodium oxide ratio being between 1:1 and 3.3:1, most preferably about 2.5:1 since that is the most common molar ratio found in detergent formulations. At least 1% sodium silicate is required to bind the bead, but more than 20% sodium silicate limits the amount of sodium alumino silicate that can be added to the system without enough improvement in bead strength to justify the lower alumino silicate levels. The most preferred binding agent would be a sodium polysilicate having a silica to sodium oxide ratio of 2.5:1 made by the process described in U.S. Pat. No. 3,838,192 which is incorporated herein by reference to show a method of producing a suitable binding agent for the present invention.

Suitable solubilizing agents include soluble sodium phosphates, carbonates, bicarbonates, tetraborates and sodium sulfate. At least 1% solubilizing agent is required to make the bead soluble in water, but more than 20% solubilizing agent limits the amount of sodium alumino silicate that can be added to the system without any corresponding increase in solubility. The preferred solubilizing agent is sodium sulfate because it is inexpensive and because it is widely used in detergents.

Some water is needed in the water-softening bead, otherwise the ion exchange capacity of the sodium alumino silicate is reduced. This water content should be kept to a minimum so that the sodium alumino silicate content will not be limited.

In a preferred embodiment of the present invention, at least 66% by weight of sodium alumino silicate on an anhydrous basis is added to 1 to 20% by weight of sodium polysilicate having a silica to sodium oxide ratio of 2.5:1 and made by the process of U.S. Pat. No. 3,838,191; 1 to 20% by weight of sodium sulfate and the remainder being water. This slurry is then dried with nozzle atomization in a spray dryer at inlet temperatures of below 540° C. to produce beads. If the beads are dried at a temperature of above 540° C. some ion exchange capacity can be lost.

Other methods can be used to dry the material. One could use a fluid bed dryer or some other source of pelletizer, such as a drum pelletizer, a disc pelletizer, etc., but the preferred method of drying is with a spray dryer using nozzle atomization. The resulting bead from spray drying with nozzle atomization is a spherical bead having improved flow properties. The spray drying process is also an efficient way to get the desired particle size.

EXAMPLES

The invention will be further illustrated by the following examples which set forth particularly advantageous method and composition embodiments. While the examples prove to illustrate the present invention, they are not intended to limit it.

PREPARATION OF SODIUM ALUMINO SILICATE

EXAMPLE X

An aqueous solution of sodium silicate having a silica to sodium oxide mol ratio of 2.5 was subjected to vigorous agitation and contacted with an aqueous solution of sodium aluminate to form a reaction mass. A finely divided pigmentary amorphous sodium alumino silicate intermediate was precipitated as the reaction mass was agitated, the temperature of the reaction mass was maintained in the range of 21° C. and 82° C. and the pH of the reaction mass was maintained at a level of at least 10.0. The precipitated intermediate was crystallized and the reaction mass comprising the crystalline product was quenched to prevent further crystallization and to provide a material having a predetermined crystalline structure. The solid crystalline sodium alumino silicate was recovered from the aqueous mass and the aqueous mass was recycled to provide a source of sodium aluminate. This process is described in U.S. Pat. No. 4,041,135.

EXAMPLE Y

An aqueous solution of sodium silicate having a silica to sodium oxide mol ratio of 2.6 was subjected to rigorous agitation and contacted with a dilute solution of sodium aluminate having a sodium oxide to aluminum oxide mol ratio of 2.0 to form a reaction mass. The reaction mass was agitated and the pH was maintained at a level of at least 10.5 to precipitate a finely divided amorphous sodium alumino silicate having an ion exchange capacity equal to crystalline zeolites and having an oil absorption of at least 75 cc/100 g; a BET surface area of at least 10 sq m/g; a pack density greater than 10 pounds per cubic foot; a mercury intrusion void greater than 2.0 cc/g; a base exchange capacity of at least 200 mg calcium carbonate/g; and an initial water softening rate of 2.7 grains per gallon per minute. This process is described in U.S. patent application Ser. No. 621,314.

PREPARATION OF SODIUM SILICATE

EXAMPLE Z

A sodium polysilicate was prepared by the following process. 4,024 kg of a 50% NaOH solution was charged to a stainless steel autoclave provided with means for continuously agitating the solution. A silica slurry, prepared by dispersing 4,024 kg of silica flour into 2,292 kg of water, was then charged to the reactor. The autoclave was sealed and the temperature of the aqueous mixture was preheated (by the introduction of steam into an exterior steam jacket) to 157° C. over a one-hour period producing a pressure of 8.1 kg/sq cm. The reaction mixture was thereafter maintained at this temperature for 3 hours. Continuous agitation was maintained throughout the heat-up and reaction period. At the end of the three-hour reaction cycle, the steam was shut off and the autoclave partially vented to reduce the pressure to about 5.3 kg/sq cm. The vent was then fully opened and the reaction mixture fed by gravity into a drop tank positioned beneath the autoclave and containing 6,869 kg of water at 25° C. The mixture in the drop tank was pumped through a clarification filter and introduced into the upper portion of a spray dryer.

The aqueous mixture was fed into the spray dryer at a rate of 9,571 kg per hour, the concentration of the mixture comprising 0.48 kg of sodium polysilicate per liter. The speed of the spray wheel was about 11,000 rpm. The spray dryer inlet and outlet air temperatures were 316° and 93° C., respectively. The spray dried product was collected and withdrawn from the base of the spray dryer by a screw conveyor. 5,661 kg of sodium polysilicate, having a silica to sodium oxide weight ratio of 2.4:1 and a density of 0.128 g/cc was recovered from the spray dryer. The fact that the product produced in this example was partially polymerized was established by conductivity tests as determined by the Harman technique, set forth in R. W. Harman, *Journal of Physical Chemistry* 32, 44–60 (1928). This process is described in U.S. Pat. No. 3,838,192.

PREPARATION OF WATER-SOFTENING BEAD

EXAMPLES I-V

Three feed compositions were prepared.

Composition A was made of 260 lbs of the sodium alumino silicate of Example X, 10 lbs of the sodium silicate of Example Z, 25 lbs of sodium sulfate, and 205 lbs of water. The resulting product contained 68.4% anhydrous sodium alumino silicate, 2.7% sodium silicate, 8.1% sodium sulfate and 23.5% water.

Composition B was made of 112.5 lbs of the sodium alumino silicate of Example X, 2.5 lbs of the sodium silicate of Example Z, 22.5 lbs of sodium sulfate, and 112.5 lbs of water. The resulting product contained 66.2% anhydrous sodium alumino silicate, 1.4% sodium silicate, 16.6% sodium sulfate and 15.8% water.

Composition C was made of 112.5 lbs of the sodium alumino silicate of Example X, 22.5 lbs of the sodium silicate of Example Z, 2.5 lbs of sodium sulfate, and 112.5 lbs of water. The resulting product contained 66.0% anhydrous sodium alumino silicate, 13.7% sodium silicate, 1.8% sodium sulfate and 18.5% water.

All of the feeds were smooth white slurries of varying viscosity with composition A being the thickest and C the thinnest. All became more viscous when heated. The test conditions and results are shown on Table I.

EXAMPLE I 82 kg of composition A was fed into a spray dryer having an inlet temperature of 355° C. and an outlet temperature of 150° C. for 17 minutes. The test conditions and results are shown in Table I.

EXAMPLE II 27 kg of composition A was fed into a spray dryer having an inlet temperature of 250° C. and an outlet temperature of 127° C. for 7 minutes. The test conditions and results are shown in Table I.

EXAMPLE III 90 kg of composition A was fed into a spray dryer having an inlet temperature of 245° C. and an outlet temperature of 137° C. for 24 minutes. The test conditions and results are shown in Table I.

EXAMPLE IV 105 kg of composition B was fed into a spray dryer having an inlet temperature of 295° C. and an outlet temperature of 136° C. for 28 minutes. The test conditions and results are shown in Table I.

EXAMPLE V 54 kg of composition C was fed into a spray dryer having an inlet temperature of 265° C. and an outlet temperature of 135° C. for 21 minutes. The test conditions and results are shown in Table I.

TABLE I

| Example | I | II | III | IV | V |
|---|---|---|---|---|---|
| Feed | | | | | |
| Composition | A | A | A | B | C |
| Temperature (°C.) | 45 | 42 | 40 | 45 | 55 |
| Kg | 82 | 27 | 90 | 105 | 54 |
| Test Conditions | | | | | |
| Inlet Temp (°C.) | 355 | 250 | 245 | 295 | 265 |
| Outlet Temp (°C.) | 150 | 127 | 137 | 136 | 135 |
| Spray Pressure (psig) | 400 | 400 | 330 | 210 | 120 |
| Air Flow kg/hr | 1835 | 1835 | 1835 | 1835 | 1835 |
| Running Time (min) | 17 | 7 | 24 | 28 | 21 |
| Product Analysis | | | | | |
| Mean Particle Size (m) | 190 | — | 350 | 210 | 220 |
| Screen Analysis (wt %) | | | | | |
| 420 microns | 0 | — | 1.3 | 0.5 | 1.5 |
| 250 microns | 15.8 | — | 71.5 | 30.8 | 36.8 |
| 117 microns | 55.5 | — | 87.7 | 70.0 | 70.5 |
| 150 microns | 76.9 | — | 93.3 | 88.3 | 85.5 |
| 125 microns | 89.5 | — | 96.0 | 97.0 | 93.6 |
| 90 microns | 99.0 | — | 98.0 | 00.9 | 99.0 |
| Moisture (%) | | | | | |
| 30 min @ 125° C., infrared | — | 6.4 | 10.8 | 8.0 | 7.5 |
| Poured Density (gm/cc) | 0.57 | 0.59 | 0.61 | 0.58 | 0.66 |
| Tapped Density 100X (gm/cc) | 0.62 | 0.63 | 0.64 | 0.61 | 0.71 |
| Cyclone Fraction | | | | | |
| % of Total Yield | 1.0 | 1.0 | 1.0 | 1.5 | 2.2 |

Thus, in operation, an inorganic water-softening bead is formed comprising at least 66% by weight sodium alumino silicate on an anhydrous basis; from 1 to 20% by weight of a binding agent; from 1 to 20% by weight of a solubilizing agent; and the remainder being water or residual moisture.

The above ingredients are mixed together in a slurry which is then dried, preferably with nozzle atomization, in a spray dryer at inlet temperatures below 540° C.

While the present invention has been described with reference to specific embodiments, this application is intended to cover those various changes and substitutions which may be made by those skilled in the art without departing from the spirit and scope of the appended claims.

We claim:

1. A spray dried inorganic water-softening bead consisting of:
   (a) at least 66% by weight of sodium aluminosilicate on an anhydrous basis having a silica to aluminum oxide ratio of between 2:1 and 4:1 and a sodium oxide to aluminum oxide ratio of between 0.8:1 and 1.2:1;
   (b) from 1 to 20% by weight of sodium silicate with a silica to sodium oxide ratio of between 1:1 and 3.3:1;
   (c) from 1 to 20% by weight of a solubilizing agent selected from the group consisting of soluble sodium phosphates, sodium carbonates, sodium bicarbonates, sodium tetraborates and sodium sulfate; and (d) the remainder being water.

2. An inorganic water-softening bead according to claim 1 wherein said sodium silicate has a silica to sodium oxide ratio of about 2.5:1.

3. An inorganic water-softening bead according to claim 1 wherein said solubilizing agent is sodium sulfate.

4. A spray dried inorganic water-softening bead consisting of:
  (a) at least 66% by weight of sodium aluminosilicate on an anhydrous basis having a silica to aluminum oxide ratio of between 2:1 and 4:1 and a sodium oxide to aluminum oxide ratio of between 0.8:1 and 1.2:1;
  (b) from 1 to 20% by weight of sodium silicate with a silica to sodium oxide ratio of about 2.5:1;
  (c) from 1 to 20% by weight of sodium sulfate; and
  (d) the remainder being water.

5. An inorganic water-softening bead according to claim 4 wherein said inorganic water-softening bead has a density of between 36 and 46 pounds per cubic feet.

6. An inorganic water-softening bead according to claim 4 wherein said inorganic water-softening bead has a density of between 40 and 42 pounds per cubic feet.

7. An inorganic water-softening bead according to claim 4 wherein said sodium aluminosilicate has a silica to aluminum oxide ratio of between 2:1 and 3:1.

8. An inorganic water-softening bead according to claim 4 wherein said sodium silicate is a sodium polysilicate.

* * * * *